United States Patent
Fukami et al.

(10) Patent No.: US 10,124,663 B2
(45) Date of Patent: Nov. 13, 2018

(54) EXHAUST HEAT RECOVERING DEVICE

(71) Applicant: NISSAN MOTOR CO., LTD., Yokohama-shi, Kanagawa (JP)

(72) Inventors: Toru Fukami, Kanagawa (JP); Masashi Koshijima, Kanagawa (JP)

(73) Assignee: NISSAN MOTOR CO., LTD., Yokoahama-shi, Kanagawa (JP)

( * ) Notice: Subject to any disclaimer, the term of this patent is extended or adjusted under 35 U.S.C. 154(b) by 0 days.

(21) Appl. No.: 15/576,372

(22) PCT Filed: May 27, 2015

(86) PCT No.: PCT/JP2015/065202
§ 371 (c)(1),
(2) Date: Nov. 22, 2017

(87) PCT Pub. No.: WO2016/189680
PCT Pub. Date: Dec. 1, 2016

(65) Prior Publication Data
US 2018/0147933 A1    May 31, 2018

(51) Int. Cl.
| | |
|---|---|
| *B60K 13/04* | (2006.01) |
| *F01N 5/02* | (2006.01) |
| *F02N 19/10* | (2010.01) |
| *F02M 26/30* | (2016.01) |
| *F01N 3/10* | (2006.01) |
| *F01N 13/18* | (2010.01) |
| *F02M 26/12* | (2016.01) |
| *F02M 26/28* | (2016.01) |
| *B60K 5/12* | (2006.01) |

(52) U.S. Cl.
CPC ................ *B60K 13/04* (2013.01); *F01N 3/10* (2013.01); *F01N 5/02* (2013.01); *F01N 13/1811* (2013.01); *F02M 26/30* (2016.02); *F02N 19/10* (2013.01); *B60K 5/1208* (2013.01); *B60Y 2400/48* (2013.01); *F01N 2240/00* (2013.01); *F01N 2240/02* (2013.01); *F02M 26/12* (2016.02); *F02M 26/28* (2016.02); *Y02T 10/16* (2013.01)

(58) Field of Classification Search
CPC ...... F16L 27/10; F16L 27/1004; F02M 26/30; F02M 26/12; B60K 13/04; F01N 5/02; F01N 13/1811; F02N 19/10
See application file for complete search history.

(56) References Cited

U.S. PATENT DOCUMENTS

2013/0037235 A1* 2/2013 Sakabe ............... F01N 5/02
165/41

FOREIGN PATENT DOCUMENTS

| JP | S58-27521 U | 2/1983 |
| JP | 2002-248926 A | 9/2002 |

(Continued)

*Primary Examiner* — Jacob Amick
(74) *Attorney, Agent, or Firm* — Drinker Biddle & Reath LLP

(57) ABSTRACT

An exhaust heat recovering device comprising an exhaust heat recovering tool (10) adapted to recover a heat of an exhaust gas of an internal combustion engine for a vehicle and an inflow side pipeline (14) and an exhaust side pipeline (13) adapted to connect the internal combustion engine and the exhaust heat recovering tool, wherein the inflow side pipeline (14) and the exhaust side pipeline (13) are mounted only on a component included in a non-vehicle body vibration system supported on a vehicle body (2) through an elastic body (4, 5, 6).

5 Claims, 5 Drawing Sheets

(56) References Cited

FOREIGN PATENT DOCUMENTS

| JP | 2008-274885 A | 11/2008 |
| JP | 2010-223060 A | 10/2010 |
| WO | WO-2011/102323 A1 | 8/2011 |

* cited by examiner

EXHAUST HEAT RECOVERING DEVICE

TECHNICAL FIELD

The present invention relates to an exhaust heat recovering device which recovers a heat of an exhaust gas of an internal combustion engine to a heat medium circulating through the internal combustion engine by an exhaust heat exchanger interposed in an exhaust passage of the internal combustion engine.

BACKGROUND ART

As the exhaust heat recovering device, JP2008-274885A discloses a device including a heat medium circuit in which a heat medium exhausted from an internal combustion engine is first sent to a heater core, and the heat medium having passed through the heater core flows into a heat exchanger as it is.

SUMMARY OF INVENTION

In general, the internal combustion engine is mounted on a vehicle body through an elastic member so as to form an engine vibration system, and an exhaust passage is mounted on the vehicle body through the elastic member so as to form an exhaust vibration system. On the other hand, in general, the heater core is fixed/supported in the vicinity of an engine compartment of the vehicle body and is included in a vehicle body vibration system.

That is, in the exhaust heat recovering device in the aforementioned document, a heat medium circuit is formed in which components between the different vibration systems are connected by a heat medium pipeline. Thus, relative displacement between each of the vibration systems during a vehicle operation needs to be absorbed by the heat medium pipeline. In order to absorb the relative displacement, such constitution using a hose having flexibility formed of rubber, silicone or the like, for example, as a joint for connecting the pipelines made of metal is known. However, when the relative displacement becomes large such as in a case between the heater core and the exhaust heat exchanger as in the aforementioned document, a length of the hose required for absorbing the vibration increases, which incurs a drop in layout ability and a cost increase of the heat medium pipeline. Moreover, since the hose has a heat resistant temperature lower than the pipeline made of metal, a heat insulating measure from the exhaust passage or the like is needed. Thus, if the hose length increases, not only a material cost but a cost for a measure against heat insulation also increases.

Thus, the present invention has an object to provide an exhaust heat recovering device including a heat medium channel which does not incur a drop in layout ability or a cost increase of the pipeline.

According to one embodiment, an exhaust heat recovering device comprising an exhaust heat recovering tool adapted to recover a heat of an exhaust gas of an internal combustion engine for a vehicle and an inflow side pipeline and an exhaust side pipeline adapted to connect the internal combustion engine and the exhaust heat recovering tool. The inflow side pipeline and the exhaust side pipeline are mounted only on a component included in a non-vehicle body vibration system supported on a vehicle body through an elastic body.

DESCRIPTION OF EMBODIMENTS

Hereinafter, embodiments of the present invention will be described by referring to the attached drawings.

(First Embodiment)

First, configuration of an exhaust heat recovering device 100 according to a first embodiment of the present invention will be described.

Figure 1:
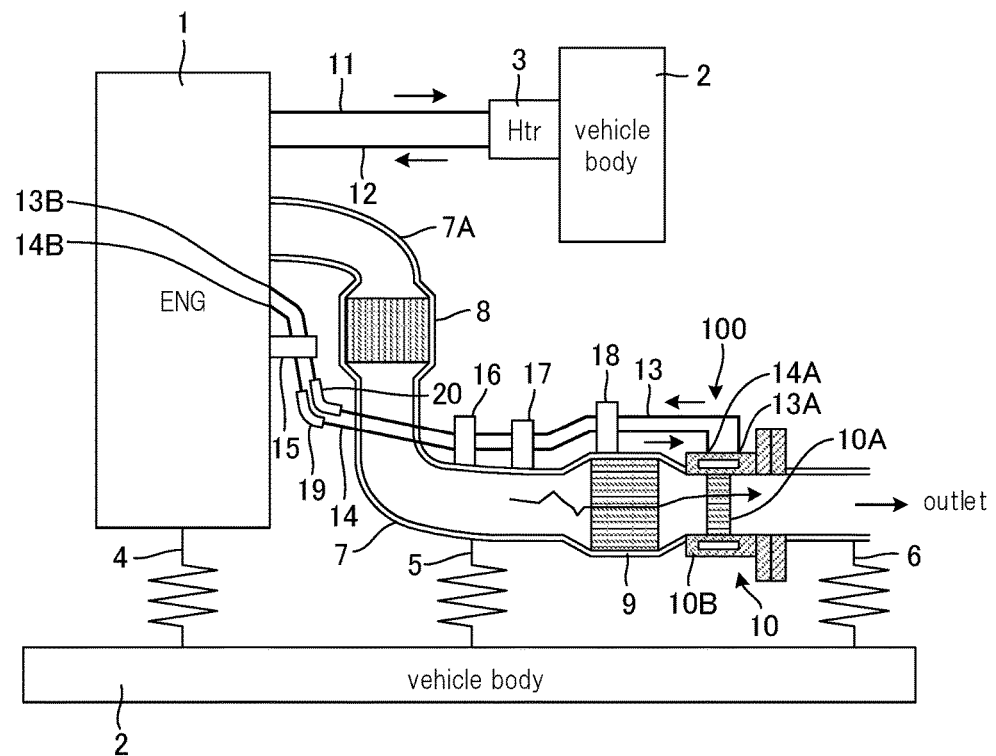
FIG. 1 is a configuration diagram of an exhaust heat recovering device according to a first embodiment.

FIG. 1 is a view schematically illustrating configuration of the exhaust heat recovering device 100.

An internal combustion engine (hereinafter, referred to also as an "engine") 1 is mounted on a vehicle body 2 through an engine mount 4 having elasticity. As a result, an engine vibration system including the engine 1 and the engine mount 4 is formed. The engine vibration system also includes components attached to the engine 1 such as an alternator, a throttle body and the like, not shown.

An exhaust passage 7 has one end portion connected to the engine 1 and is mounted on the vehicle body through exhaust mounts 5 and 6 having elasticity. As a result, an exhaust vibration system including the exhaust passage 7 and the exhaust mounts 5 and 6 is formed. It is assumed that the "exhaust passage 7" also includes an exhaust manifold 7A.

Moreover, in the exhaust passage 7, a manifold catalyst 8, an underfloor catalyst 9, and an exhaust heat exchanger 10 are interposed from the exhaust manifold 7A side toward an outlet side. The manifold catalyst 8 is disposed on an immediate downstream side of the exhaust manifold 7A. That is, the manifold catalyst 8 is disposed in an engine compartment. On the other hand, the underfloor catalyst 9 is disposed on a lower surface of a vehicle body 2. However, in the figure, the exhaust passage 7 is schematically illustrated above the vehicle body 2 for convenience.

The exhaust heat exchanger 10 is constituted by including a lattice-shaped or honeycomb-shaped heat receiving member 10A disposed in a channel of the exhaust passage 7 and an annular member 10B including a heat medium channel therein and in contact with an outer periphery of the heat receiving member 10A. The heat receiving member 10A is formed of a metal material, for example, and is heated by a heat of the exhaust gas flowing through the exhaust passage 7. When the heat receiving member 10A is heated, a temperature of the annular member 10B in contact with the outer periphery of the heat receiving member 10A also rises, and heat exchange is performed with the heat medium circulating therein. The heat medium circulating in the annular member 10B is a coolant of the engine 1. The coolant is supplied from the engine 1 to the annular member 10B through an inflow side pipeline 14 and performs heat exchange in the channel of the annular member 10B and then, is returned to the engine 1 through an exhaust side pipeline 13.

The inflow side pipeline 14 is formed of a metal material, and one end thereof is a heat medium supply port 14A connected to the annular member 10B, while the other end is a heat medium take-out port 14B connected to the engine 1. The inflow side pipeline 14 is mounted on a component of the engine vibration system and a component of the exhaust vibration system. For example, it is mounted on the engine 1 included in the engine vibration system through a first mount 15 as illustrated in FIG. 1 and is mounted on the exhaust passage 7 included in the exhaust vibration system through a second mount 16, a third mount 17, and a fourth mount 18. In this case, a portion from the heat medium supply port 14A to the first mount 15 becomes a first inflow-side pipeline portion, and a portion from the first mount 15 to the heat medium take-out port 14B becomes a first inflow-side pipeline portion.

In the inflow-side pipeline 14, a hose 19 as a vibration absorbing portion is interposed between the first mount 15 and the second mount 16. The hose 19 is formed of an elastic material such as rubber, silicon and the like, for example.

The exhaust side pipeline 13 is formed of a metal material similarly to the inflow side pipeline 14, and one end is a heat medium exhaust port 13A connected to the annular member 10B, while the other end is a heat medium return port 13B connected to the engine 1. The exhaust side pipeline 13 is mounted on the engine 1 and the exhaust passage 7 through the first mount 15 to the fourth mount 18. In this case, a portion from the heat medium exhaust port 13A to the first mount 15 becomes a first exhaust-side pipeline portion, and a portion from the first mount 15 to the heat medium return port 13B becomes a second exhaust-side pipeline portion.

In the exhaust side pipeline 13, too, a hose 20 is interposed similarly to the inflow side pipeline 14.

The first mount 15 to the fourth mount 18 are made of a material excellent in heat resistance such as metal, a heat-resistant resin and the like and fixes/supports the inflow side pipeline 14 and the exhaust side pipeline 13.

In FIG. 1, each of the mounts 15 to 18 fixes/supports the inflow side pipeline 14 and the exhaust side pipeline 13, respectively, but the mount fixing/supporting the inflow side pipeline 14 and the mount fixing/supporting the exhaust side pipeline 13 may be independent.

The exhaust heat exchanger 10 is not limited to those having the aforementioned configuration. For example, the configuration may be such that a pipeline through which the heat medium flows is exposed inside the exhaust passage 7, and heat exchange is performed between the pipeline and the exhaust gas.

The exhaust heat recovering device 100 of this embodiment is constituted by including the aforementioned exhaust heat exchanger 10, the inflow side pipeline 14, and the exhaust side pipeline 13. As a pump for circulating the coolant, a water pump generally included in a liquid-cooling type internal combustion engine may be used or a new pump may be provided for exhaust heat recovery.

A heater core 3 is a component included in an air conditioning device for adjusting a cabin temperature. To the heater core 3, the coolant is supplied through a heater inlet-side pipeline 11, and the coolant having performed heat exchange with air in the heater core 3 is returned to the engine 1 through a heater outlet-side pipeline 12. Since the heater core 3 is fixed/supported in the vicinity of a front end of the cabin, it is included in the vehicle body vibration system.

Subsequently, an effect of configuration of the exhaust heat recovering device 100 as described above will be explained.

As described above, in the exhaust heat recovering device 100 of this embodiment, the heat medium supply port 14A and the heat medium exhaust port 13A are connected to the components included in the exhaust vibration system, and the heat medium take-out port 14B and the heat medium return port 13B are connected to the components included in the engine vibration system.

During the vehicle operation, since the component included in the engine vibration system and the component included in the exhaust vibration system perform vibration different from that of the vehicle body vibration system, relative displacement is generated between the component included in the engine vibration system and the component included in the vehicle body vibration system. Thus, the second mount 16 to the fourth mount 18 cause the inflow side pipeline 14 and the exhaust side pipeline 13 to be mounted on the exhaust passage 7 included in the same exhaust vibration system as the exhaust heat exchanger 10 instead of the vehicle body 2. That is, there is no portion, between the heat medium supply port 14A and the first mount 15, that is, in the first inflow-side pipeline portion, which is supported by the component of the vibration system different from the engine vibration system or the exhaust vibration system. The same applies to a space between the heat medium exhaust port 13A and the first mount 15, that is, the first exhaust-side pipeline portion.

Moreover, during the vehicle operation, the component included in the engine vibration system and the component included in the exhaust vibration system perform vibration different from each other, and relative displacement is generated on the component included in the engine vibration system and the component included in the exhaust vibration system in some cases. That is, relative displacement may occur between the first mount 15 and the second mount 16. Thus, in order to absorb the aforementioned relative displacement, in this embodiment, the hose 19 is interposed between the first mount 15 and the second mount 16 of the inflow side pipeline 14 and the hose 20 between the first mount 15 and the second mount 16 of the exhaust side pipeline 13, respectively.

Figure 2:
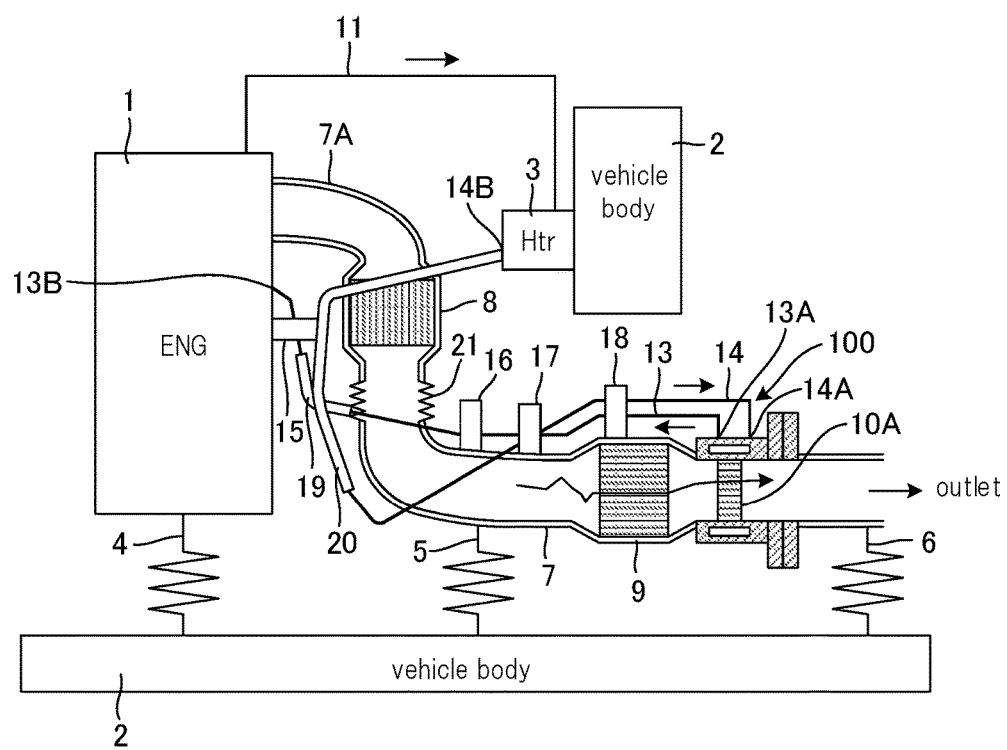
FIG. 2 is a configuration diagram of the exhaust heat recovering device as a comparative example.

However, since the engine 1 and the exhaust passage 7 are connected to each other, the relative displacement between the component included in the engine vibration system and the component included in the exhaust vibration system is smaller than the relative displacement between the component included in the engine vibration system and the component included in the vehicle body vibration system and the relative displacement between the component included in the exhaust vibration system and the component included in the vehicle body vibration system, and thus, as compared with a case where the heat medium take-out port 14B or the heat medium return port 13B is supported on the vehicle body 2 as illustrated in FIG. 2 which will be described later, the lengths of the hose 19 and the hose 20 (hereinafter, referred to as a hose length) can be shortened.

FIG. 2 is a view illustrating configuration of the exhaust heat recovering device 100 as a comparative example, and the same reference numerals are given to the components having the same functions as those in FIG. 1.

In FIG. 1, the heat medium circuit circulating through the engine 1 and the heater core 3 and the heat medium circuit circulating through the engine 1 and the exhaust heat exchanger 10 are independent from each other, while in FIG. 2, the heater core 3 is incorporated in the heat medium circuit circulating through the engine 1 and the exhaust heat exchanger 10. That is, the heat medium take-out port 14B is connected to the heater core 3 included in the vehicle body vibration system in FIG. 2.

As described above, as compared with the relative displacement between the engine vibration system and the exhaust vibration system, the relative displacement between the exhaust vibration system and the vehicle body vibration system becomes large and thus, the hose 20 needs to absorb the relative displacement larger than the configuration in this embodiment. Thus, in the comparative example, the hose 20 needs to be made longer than that in this embodiment.

Moreover, a pipeline path from the heater core 3 disposed in the cabin to the exhaust heat exchanger 10 disposed under the floor penetrates a bulkhead from an inside of the cabin and enters the engine compartment and leads to under the floor therefrom. Moreover, by considering a connection work between the hose 20 and the inflow side pipeline 14, a connection portion is preferably located at a position which can be easily accessed from the vehicle body lower surface. Then, the pipeline path from the engine compartment to under the floor along the exhaust passage 7 is preferable. However, since the hose 20 has a heat resistant temperature lower than the metal pipeline, a insulating measure for protecting the hose 20 from an influence of the heat from the exhaust passage 7 is required. As the insulating measure, wrapping the hose 20 with an insulating member, providing a heat insulating plate between the hose 20 and the exhaust passage 7 and the like can be considered, but any of them incurs a cost increase.

On the other hand, in order to avoid the cost increase by the insulating measure, such a pipeline path that the hose 20 is provided far away from the exhaust passage 7 can be considered. However, for that purpose, the hose 20 needs to be provided far away from the exhaust passage 7 while interference with the other devices is avoided in the engine compartment and the pipeline path needs to be mounted on the second mount 16 to the fourth mount 18 provided in the exhaust passage 7 under the floor. As a result, the path is made complicated, and layout ability is deteriorated.

On the other hand, in this embodiment, since the relative displacement between the heat medium supply port 14A and the heat medium exhaust port 13A and the first mount 15 used for mounting the inflow side pipeline 14 and the exhaust side pipeline 13 on the internal combustion engine 1 can be suppressed, the long hose as in the comparative example does not have to be used. As a result, according to this embodiment, the cost increase or complication of the pipeline path involved in the insulating measure can be suppressed.

The heater inlet-side pipeline 11 and the heater outlet-side pipeline 12 both have their one ends connected to the engine 1 included in the engine vibration system, while the other ends are connected to the heater core 3 included in the vehicle body vibration system. Therefore, in these pipelines, too, a hose similar to the hoses 19 and 20 is preferably interposed in order to absorb the relative displacement. However, since it is easy to layout the heater inlet-side pipeline 11 and the heater outlet-side pipeline 12 so as to be located away from the exhaust passage 7, even if the hose is interposed, the cost increase caused by the insulating measure or the like can be suppressed.

Figure 3:
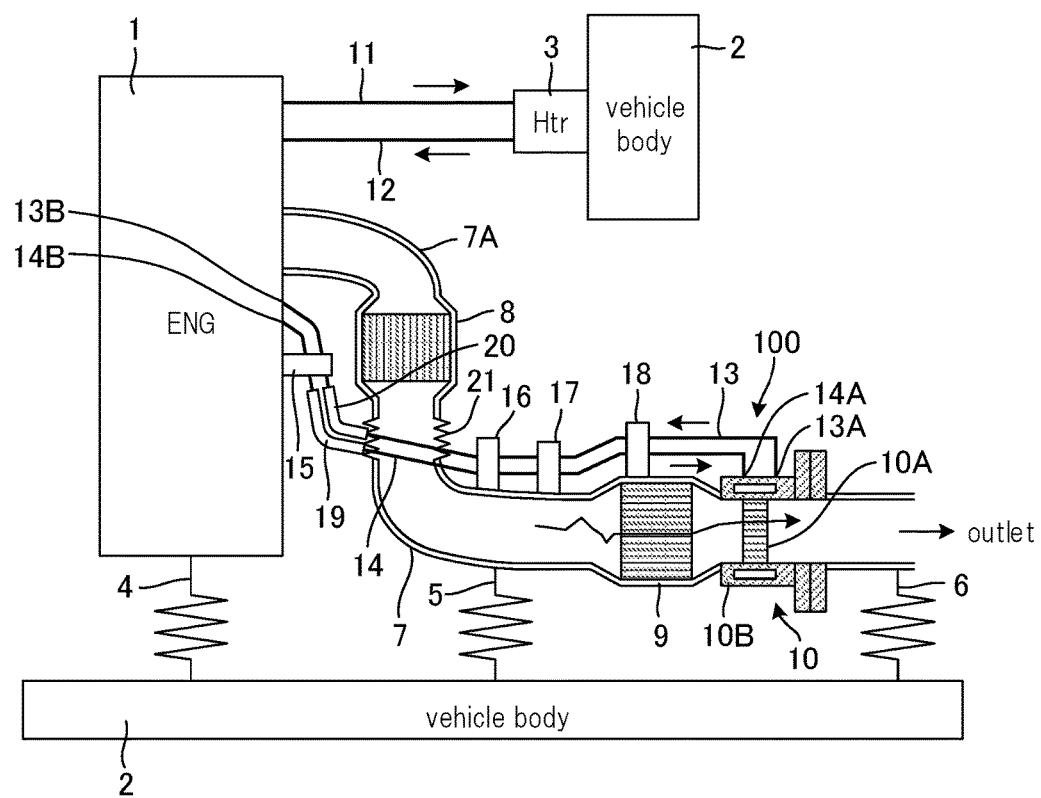
FIG. 3 is a configuration diagram of the exhaust heat recovering device as another example of the first embodiment.

As illustrated in FIG. 3, when a flexible tube 21 is provided between the manifold catalyst 8 in the exhaust passage 7 and the underfloor catalyst 9, too, the exhaust heat recovering device 100 of this embodiment exerts the aforementioned effect.

Moreover, the hoses 19 and 20 are used for absorbing the relative displacement of both ends of the inflow side pipeline 14 and the exhaust side pipeline 13 in the aforementioned explanation, but the hoses 19 and 20 are not indispensable constituent elements. That is because, even in a case of a pipeline made of metal, it has elasticity, and the longer the pipeline length is, the larger the displacement by the elasticity becomes and thus, the relative displacement can be absorbed without providing the hoses 19 and 20 depending on an interval between the first mount 15 provided on the engine 1 and the second mount 16 provided in the exhaust passage 7, for example.

As described above, the exhaust heat recovering device 100 of this embodiment is constituted by the exhaust heat recovering tool 100 interposed in the exhaust passage 7 and recovering the heat of the exhaust gas of the internal combustion engine 1 and the inflow side pipeline 14 and the exhaust side pipeline 13 connecting the internal combustion engine 1 and the exhaust heat recovering tool 100. The inflow side pipeline 14 is constituted by the first inflow-side pipeline portion and the second inflow-side pipeline portion from the exhaust heat recovering tool 100 side. The exhaust side pipeline 13 is constituted by the first exhaust-side pipeline portion and the second exhaust-side pipeline portion from the exhaust heat recovering tool 100 side. The first inflow-side pipeline portion and the first exhaust-side pipeline portion are both portions from a connection portion (the heat medium supply port 14A and the heat medium exhaust port 13A) with the exhaust heat recovering tool 100 to the mount position (first mount 15) on the internal combustion engine 1, and a portion from the connection portion with the exhaust heat recovering tool 100 to the mount position on the internal combustion engine 1 is mounted only on the component included in the exhaust vibration system constituted by the exhaust passage 7 supported on the vehicle body through elastic bodies 5 and 6 or the component included in the engine vibration system constituted by the internal combustion engine 1 supported on the vehicle body through an elastic body 4. As a result, the relative displacement between heat medium supply port 14A as well as the heat medium exhaust port 13A and the first mount 15 during the vehicle operation can be suppressed. As a result, the pipeline layout can be simplified, and a cost involved in the aforementioned insulating measure can be suppressed.

In this embodiment, the second inflow-side pipeline portion and the second exhaust-side pipeline portion are portions from the first mount (mount position on the internal combustion engine 1) 15 to the heat medium take-out port 14B and the heat medium return port 13B (connection portion with the internal combustion engine 1). Therefore, a twisting moment or bending moment caused by vibration accompanying the vehicle operation can be prevented from acting on the heat medium take-out port 14B and the heat medium return port 13B.

(Second Embodiment)

A second embodiment will be described.

Figure 4:
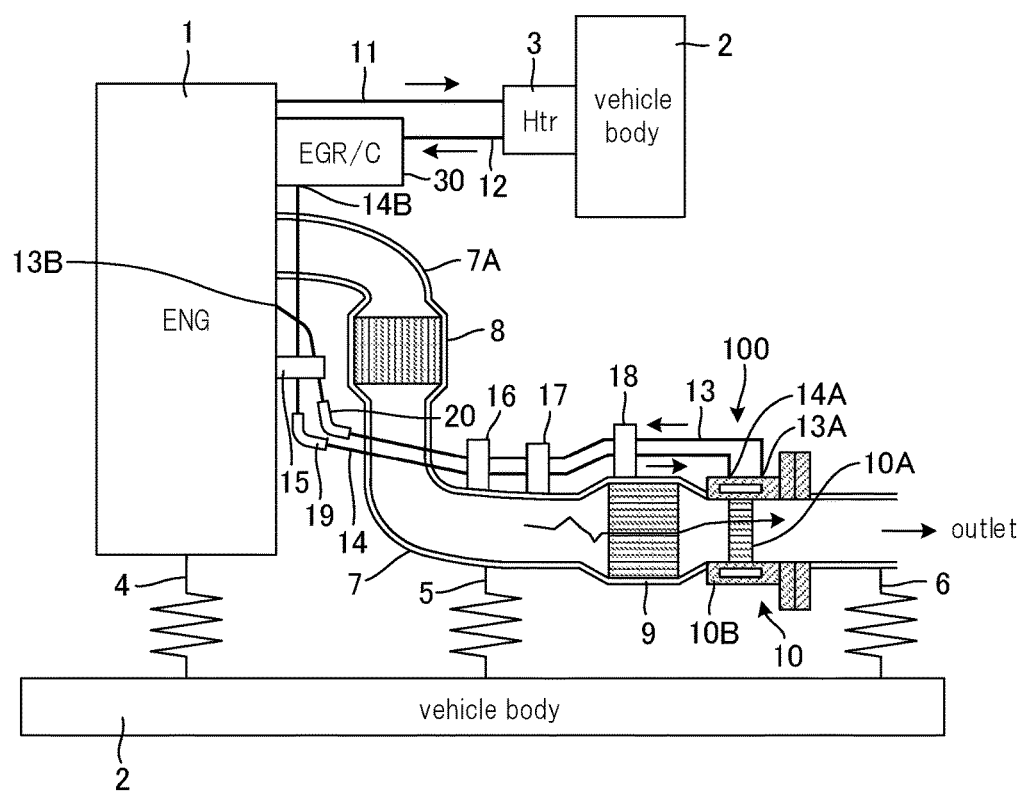
FIG. 4 is a configuration diagram of the exhaust heat recovering device according to a second embodiment.

FIG. 4 is a view schematically illustrating configuration of the exhaust heat recovering device 100 according to this embodiment.

Differences between the configuration illustrated in FIG. 1 and the configuration illustrated in FIG. 4 are a point that the heater outlet-side pipeline 12 is connected from the heater core 3 to an EGR cooler 30 and a point that the heat medium take-out port 14B of the inflow side pipeline 14 is connected to the EGR cooler 30.

The EGR cooler 30 is a part of a so-called EGR (Exhaust Gas Recirculation) system and lowers a temperature of an EGR gas by performing heat exchange between the coolant in the engine 1 and the EGR gas (exhaust gas). The EGR cooler 30 is fixed/supported on the engine 1 and is included in the engine vibration system.

In the aforementioned configuration, too, similarly to the configuration illustrated in FIG. 1, the inflow side pipeline 14 and the exhaust side pipeline 13 are mounted, between the first mount 15 supported on the internal combustion engine 1 and the exhaust heat recovering tool 10, only on the component of the engine vibration system or the component of the exhaust vibration system not on a portion supported by the component of the vibration system different from the engine vibration system or the exhaust vibration system. Therefore, the exhaust heat recovering device 100 according to the second embodiment also exerts the working effect similar to that in the first embodiment.

Moreover, according to the aforementioned configuration, since the coolant whose temperature has dropped by heat exchange with the air in the heater core 3 flows into the EGR cooler 30, cooling efficiency of the EGR cooler 30 can be improved.

As described above, in this embodiment, since the heat medium take-out port 14B is connected to the EGR cooler 30 included in the engine vibration system, in addition to the effect similar to that in the first embodiment, the cooling efficiency of the EGR cooler 30 can be further improved.

(Third Embodiment)

A third embodiment will be described.

Figure 5:
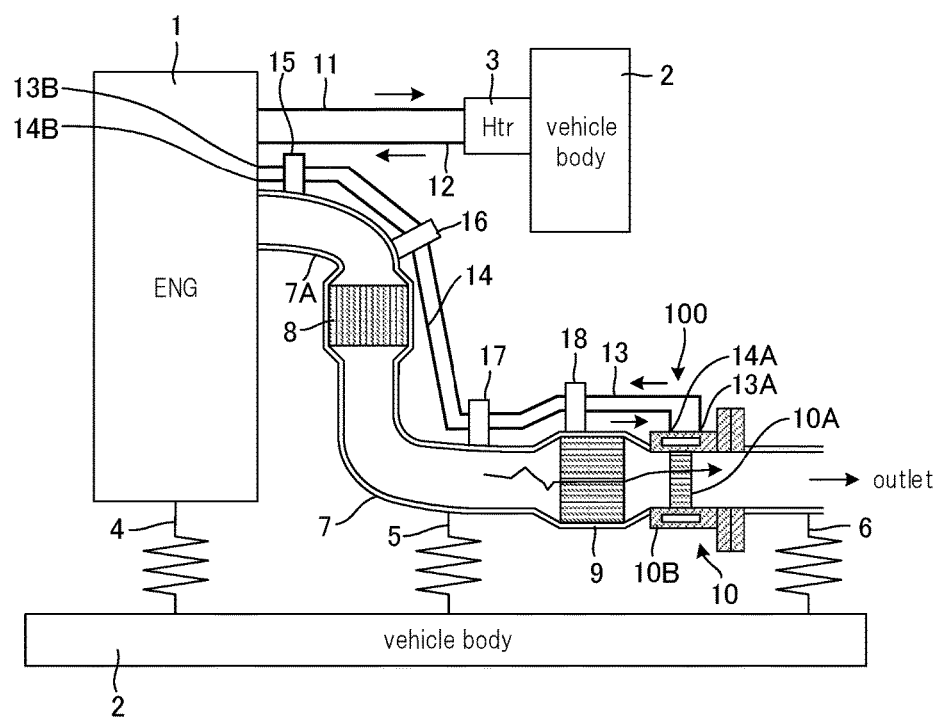
FIG. 5 is a configuration diagram of the exhaust heat recovering device according to a third embodiment.

FIG. 5 is a view schematically illustrating configuration of the exhaust heat recovering device 100 according to this embodiment.

Differences between the configuration illustrated in FIG. 1 and the configuration illustrated in FIG. 5 are a point that the first mount 15 is provided in the exhaust passage 7 in FIG. 5 and a point that the hose 19 and the hose 20 are not included. The first mount 15 is disposed at a position close to the connection portion with the internal combustion engine 1. The "close position" here means a position considered as the engine vibration system as will be described later.

The exhaust passage 7 can be considered to be the same vibration system as the internal combustion engine 1 in the connection portion with the internal combustion engine 1. However, since the exhaust passage 7 made of metal can be elastically deformed, at a position away from the internal combustion engine 1 as in the vicinity of the outlet of the exhaust passage 7, for example, relative displacement with the connection portion with the internal combustion engine 1 becomes larger, and the exhaust passage 7 can enter in a vibration mode different from that of the internal combustion engine 1. That is, when the exhaust passage 7 is seen as a whole, it forms a vibration system different from the engine vibration system.

As described above, when the exhaust passage 7 is seen as the whole exhaust passage 7, it forms an exhaust vibration system different from the engine vibration system. However, the connection portion of the exhaust passage 7 with the internal combustion engine 1 naturally makes the same vibration as that of the engine vibration system. A predetermined range in the exhaust passage 7 close to the connection portion with the internal combustion engine 1 can be considered as the engine vibration system. The specific predetermined range is determined by a specification such as a diameter or a material of the exhaust passage 7 and the like.

Thus, in this embodiment, the aforementioned predetermined range is set on the basis of the specification of the exhaust passage 7, and the first mount 15 is disposed in that range. With this configuration, a portion from the heat medium supply port 14A to the first mount 15 can be considered as the first inflow-side pipeline, a portion from the heat medium exhaust port 13A to the first mount 15 as the first exhaust-side pipeline, a portion from the first mount 15 to the internal combustion engine 1 as the second inflow-side pipeline, and a portion from the first mount 15 to the internal combustion engine 1 as the second exhaust-side pipeline. That is, the configuration of this embodiment can be considered to be similar to the configuration of the first embodiment.

Therefore, the configuration of this embodiment can also obtain the effect similar to that of the first embodiment.

FIGS. 1 and 3 to 5 illustrate four mounts, that is, the first mount 15 to the fourth mount 18, but the number of mounts is not limited to this number.

The embodiments of the present invention have been described, but the aforementioned embodiments illustrate only a part of an application example of the present invention and is not intended to limit a technical scope of the present invention to specific configuration of the aforementioned embodiments.

The invention claimed is:

1. An exhaust heat recovering device comprising:
    an exhaust heat recovering tool adapted to recover a heat of an exhaust gas of an internal combustion engine for a vehicle and
    an inflow side pipeline and an exhaust side pipeline adapted to connect the internal combustion engine and the exhaust heat recovering tool, wherein
    the inflow side pipeline and the exhaust side pipeline are mounted only on a component included in a non-vehicle body vibration system supported on a vehicle body through an elastic body; and
    at least either one of the inflow side pipeline and the exhaust side pipeline is mounted on at least either one of the internal combustion engine or the exhaust passage included in the non-vehicle body vibration system at a position other than both ends thereof.

2. The exhaust heat recovering device according to claim 1, wherein
    the exhaust heat recovering tool is interposed in an exhaust passage on a downstream of an underfloor catalyst.

3. The exhaust heat recovering device according to claim 1, wherein
    as a component included in the non-vehicle body vibration system, at least either one of the internal combustion engine and an exhaust passage through which the exhaust gas flows is included.

4. The exhaust heat recovering device according to claim 3, wherein
    at least either one of the inflow side pipeline and the exhaust side pipeline is mounted on the internal combustion engine and the exhaust passage at positions other than the both ends thereof, and a vibration absorbing unit is included between a mount position on the internal combustion engine and a mount position on the exhaust passage adjacent to the mount position on the internal combustion engine.

5. The exhaust heat recovering device according to claim 1, wherein
    a heat medium take-out port of the inflow side pipeline is connected to an EGR cooler fixed/supported on the internal combustion engine.

* * * * *